United States Patent [19]

Truby et al.

[11] Patent Number: 5,056,152
[45] Date of Patent: Oct. 8, 1991

[54] DUAL LEVEL PRIORITIZED VEHICULAR REPEATER SYSTEM

[75] Inventors: Brian K. Truby, Watauga; Randall S. Coker, Bedford, both of Tex.

[73] Assignee: Motorola, Inc., Schaumburg, Ill.

[21] Appl. No.: 153,389

[22] Filed: Feb. 8, 1988

[51] Int. Cl.⁵ .............................................. H04B 7/15
[52] U.S. Cl. .................... 455/11; 340/825.5
[58] Field of Search ............... 455/11, 73, 9, 74, 79, 455/88-90, 95, 99, 345, 38, 346; 340/825.5, 825.51

[56] References Cited

U.S. PATENT DOCUMENTS

| 4,056,779 | 11/1977 | Toler ................................... | 455/11 |
| 4,056,780 | 11/1977 | Faulkner ............................. | 455/11 |
| 4,479,245 | 10/1984 | Batlivala et al. .................... | 455/9 |
| 4,627,107 | 12/1986 | Hohlfeld et al. ................... | 455/90 |
| 4,706,086 | 11/1987 | Danizza ............................. | 455/11 |
| 4,716,407 | 12/1987 | Borras et al. .................. | 340/825.51 |
| 4,782,483 | 11/1988 | Lambert et al. ................ | 340/825.5 |
| 4,949,338 | 8/1990 | Albal et al. ...................... | 340/825.5 |

OTHER PUBLICATIONS

Motorola, Inc., "PAC-RT Portable/Mobile Vehicular Repeater System", No. 68P81010C05-A, pp. 4-41, 1982.

Primary Examiner—Curtis Kuntz
Attorney, Agent, or Firm—Juliana Agon; Thomas Berry

[57] ABSTRACT

A second level of vehicular repeater units is added to a conventional repeater system. The secondary vehicular repeaters may be specialized units, such as, motorcycle units that may be rendered inoperative due to battery drainage. The present invention provides that no secondary vehicular repeater shall transmit if a primary vehicular repeater is in the area. Only if there are no primary vehicular repeaters in an area will a secondary vehicular repeater transmit, and then, the present invention provides a prioritization arrangement so that no one secondary vehicular repeater is overly burdened by constant operation.

6 Claims, 2 Drawing Sheets

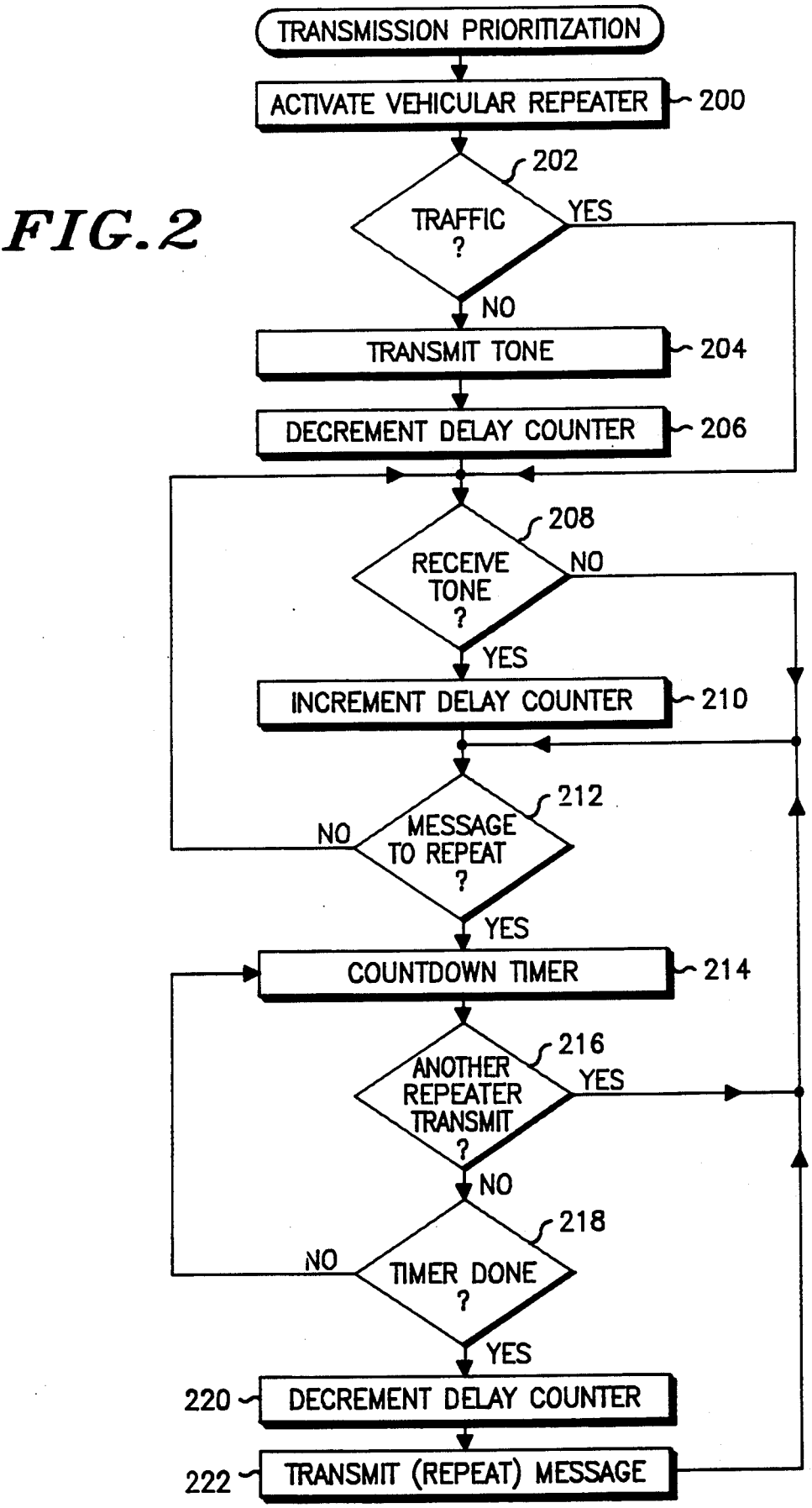

DUAL LEVEL PRIORITIZED VEHICULAR REPEATER SYSTEM

TECHNICAL FIELD

This invention relates generally to vehicular repeater systems, and more particularly to vehicular repeater systems having automatic transmission priority, and is more particularly directed toward the addition of a second operational level to such vehicular repeater systems.

BACKGROUND ART

Vehicular repeaters are known. In FIG. 1, a vehicular repeater system operates to allow a portable (10) to communicate via a vehicular repeater (12) with a base (or base repeater) (14). This arrangement operates to increase the "talk-back" range of the portable (10) by relying upon the higher transmitter power of the vehicular repeater (12). However, a common problem with early vehicular repeater systems occurred when two or more portable units were operated in the same geographic location This situation occurs quite frequently (i.e., in most fire and police situations). The problem stems from the fact that each portable generally operates on the same frequency. Thus, each vehicular repeater would attempt to repeat all of the messages simultaneously, rendering the portable-to-base messages unintelligible.

To solve this simultaneous transmission problem, a transmission priority scheme was developed. According to the transmission priority arrangement, only one of the vehicular repeaters in a certain geographic area had priority to transmit, and assumed responsibility for repeating the messages from all of the portable units to the base station.

In FIG. 2, such a priority transmission arrangement is illustrated in flow diagram form. In step 200, the vehicular repeater is activated by any suitable automatic or manual means. In decision 202, the vehicular repeater determines whether there is any "traffic" currently on-the-air between any portable or mobile units. If so, the routine proceeds to decision 208. However, if the determination of decision 202 is that there is currently no traffic, the routine proceeds to step 204 where the vehicular repeater transmits a tone (or code) on the channel. Following this, the vehicular repeater decrements a delay counter (step 206). Typically, each vehicular repeater has a delay counter, the purpose of which is to delay repeating a message from a portable unit to the base for a predetermined amount of time (typically 400 ms.). A delay state of "zero" is the priority state, which indicates no time delay between reception of a message from a portable unit, and transmission of the repeated message to the base unit. Generally, each vehicular repeater has its delay counter initialized to a delay state of one so that no repeater is appointed apriori to the priority state. Accordingly, upon being activated (step 200) the vehicular repeater decrements its delay counter (206) and assumes the priority state if no other transmission is present.

In decision 208, the vehicular repeater determines whether or not it has received another tone (or code) on the channel. This would be the case if a later arriving unit had been activated. When a vehicular repeater receives the tone (or code) on the channel, the delay counter is incremented in step 210. Thus, a vehicular repeater operating in the priority state, relinquishes the priority state (by incrementing its delay counter), while later arriving units assume the priority state (by decrementing its delay counter). Note, however, that according to decision 202, a later arriving unit that detects traffic on the channel will not transmit the tone (or code) and decrement its delay counter. Therefore, the later arriving unit does not in all cases become the priority unit.

Decision 212 determines whether a portable in the area has transmitted a message to be repeated to the base unit. If the determination of decision 212 is that there are no messages to be repeated, the routine proceeds to decision 208 where the vehicular repeater operates to either receive a message or receive a tone, which adjusts which particular vehicular repeater operates in the priority state. If however, decision 212 determines that there is a message to repeat, each vehicular repeater will begin a count-down timer (step 214) the duration of which depends upon the state of its priority counter. Thus, the repeater in the priority state would have a count-down timer of zero, repeaters in priority state one would wait one delay interval (typically 400 ms), repeaters in delay state two would wait two delay intervals, and so on. Decision 216 determines whether another vehicular repeater has transmitted (repeated) the message. Generally, an affirmative determination would result from decision 216 for all repeaters having a delay state higher than the priority state. That is, the priority repeater having a zero delay interval would repeat immediately and all other repeaters delaying their transmission would return to decision 212 upon detection of the transmission. If however, the priority repeater has left the area (or become disabled), the routine proceeds from decision 216 to decision 218, which determines whether the count down timer has completely counted down. If not, control returns to step 214, so that a loop is formed to either continue the count-down process, or to exit via decision 216. If the determination of decision 218 is that the timer has completely counted down, the routine proceeds to step 220, which decrements the delay counter so that another repeater will either assume the priority state, or move closer to assuming the priority state (i.e., such as moving from delay state 2 to delay state 1). In step 222, the repeater transmits the message and returns control to decision 212. In this way, another repeater may assume the priority state.

While the prioritization system described in conjunction with FIG. 2 is suitable for vehicular repeaters such as automobiles and trucks, such a prioritization scheme is unsuitable for other vehicles such as motorcycles, which have a smaller battery having a shorter battery life. Thus, should a motorcycle unit assume the priority state, it would be responsible for repeating all messages from all portables and may rapidly have its battery supply exhausted. Of course, another vehicular repeater may assume the priority state so that communications are maintained, however, at the conclusion of the emergency (or situation) the officer assigned to the motorcycle would discover that his motorcycle is inoperative Therefore, a need exists to be able to add a second level of vehicular repeaters that have specialized requirements or limitations compared to other (i.e., the primary) vehicular repeaters.

Accordingly, it is an object of the present invention to provide an improved vehicular repeater system.

It is a further object of the present invention to provide a vehicular repeater system having two levels of transmission responsibility.

It is another object of the present invention to provide transmission priority within each of the two transmission levels of the vehicular repeater system of the present invention.

SUMMARY OF THE INVENTION

Briefly, according to the invention, a second level of vehicular repeaters are added to a conventional vehicular repeater system. The secondary vehicular repeaters may be specialized units, such as, for example, motorcycle units that may be rendered inoperative due to battery drainage. Thus, the present invention provides that no secondary vehicular repeater shall transmit if a primary vehicular repeater is in the area. Only if there are no primary vehicular repeaters in a geographic area will a secondary vehicular repeater transmit, and then, the present invention provides a prioritization arrangement so that no one secondary vehicular repeater is overly burdened by constant operation.

BRIEF DESCRIPTION OF THE DRAWINGS

The invention, together with further objects and advantages thereof, may be understood by reference to the following description, taken in conjunction with the accompanying drawings, and the several figures of which like reference numerals identify like elements, and in which:

FIG. 2 is a flow diagram of a conventional vehicular repeater prioritization scheme;

DETAILED DESCRIPTION OF THE PREFERRED EMBODIMENT

Figure 1:
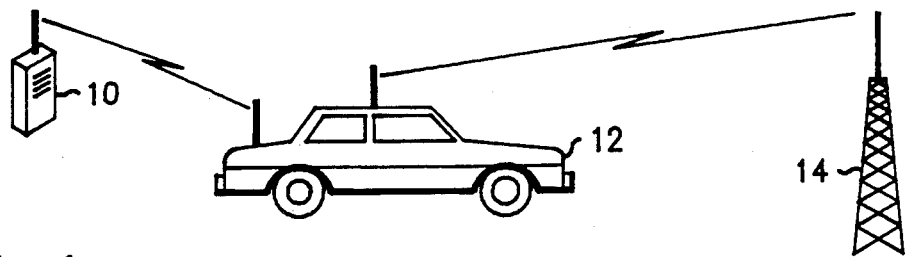
FIG. 1 is an illustration of a vehicular repeater system.
Figure 3:
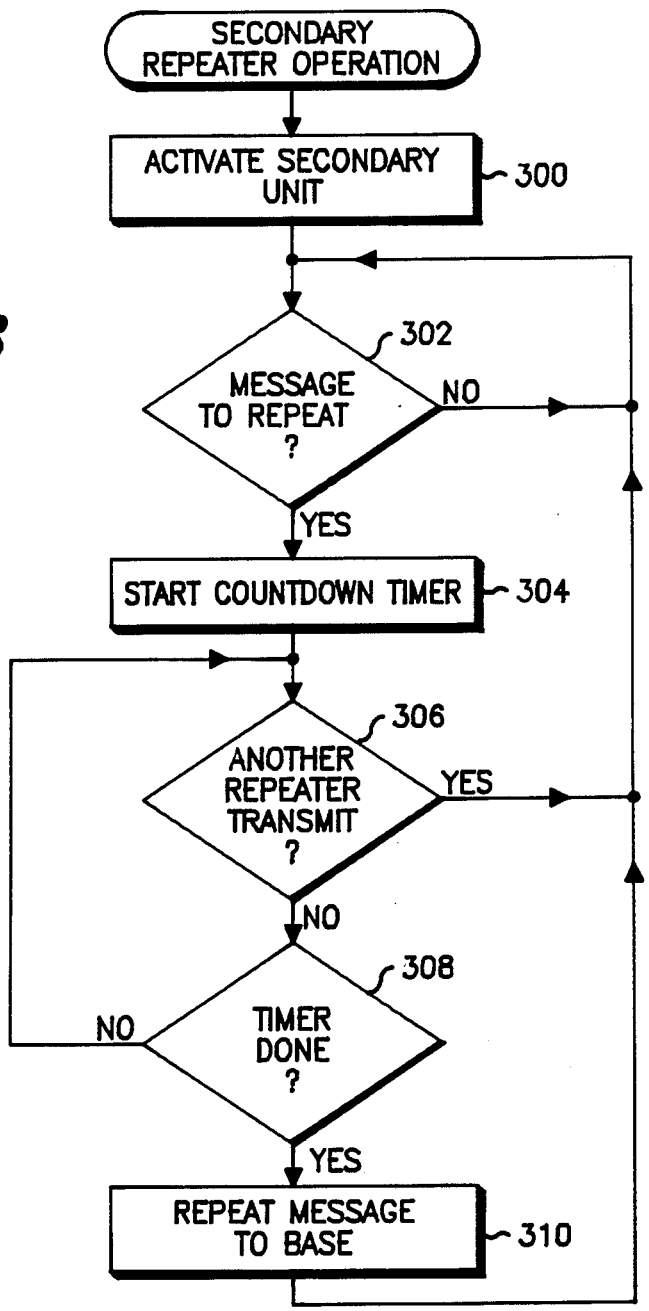
FIG. 3 is a flow diagram of the operation of the secondary vehicular repeaters of the present invention.

Referring now to FIG. 3, a flow diagram is shown illustrating the operation of the secondary vehicular repeaters according to the present invention. In step 300, the secondary vehicular repeaters are activated by any suitable automatic or manual means. The secondary repeaters may be specialized units, such as, for example, motorcycles that have a small battery and short battery life. Therefore, it is desirable that the secondary units should only be active when there are no primary units in a geographic area which could repeat the message. Further, when there are only secondary units in the area, it is desirable that no single secondary unit permanently occupy the priority state since, again, the battery may be completely drained by continuous or near continuous operation.

With these conditions in mind, decision 302 determines whether there is a message to repeat. When a portable transmits a message, both the primary and secondary units receive the message and prepare to repeat the message to the base unit. Accordingly, in step 304, the secondary units start a count-down timer, which will be counted down to zero before transmission begins. According to the present invention, the count-down time interval for the secondary unit always exceeds one delay increment of the primary units. In this way, a primary unit will always count down before a secondary unit. Only when there are no primary units in the area will a secondary unit count-down and transmit (repeat) a portable's message. Accordingly, decision 306 determines whether another repeater (either any primary or another secondary unit) has transmitted (repeated the message). An affirmative determination returns control to decision 302. However, if no other repeater has transmitted, decision 308 determines whether or not the count-down timer has counted down to zero. If not, control returns to decision 306 to continue the timer loop. If the determination of decision 308 is that the timer has counted down, and no other repeater has transmitted (decision 306), the secondary unit will repeat the message to the base (step 310). However, contrary to the operation of the primary repeater units, no consideration is given to incrementing or decrementing delay priority states as all delays in the secondary units are fixed and predetermined.

Within the secondary unit level, prioritization is not desired as it could render a single motorcycle unit with a limited battery life inoperative. Of course, the count-down and repeat procedures are contemplated by the present invention to be implemented in a suitable software algorithm that is part of an overall software operating system of a secondary repeater. Accordingly, it is extremely unlikely that any two such secondary units would be "synchronized" in the performance of their software task. Thus, it is therefore statistically unlikely that any two secondary units would count down to zero and repeat simultaneously. Accordingly, no other prioritization mechanism is required for the secondary units.

What is claimed is:

1. A dual level prioritized vehicular repeater system, comprising:
    at least one primary unit constructed and arranged such that only one primary unit has, at any particular time, priority to repeat a message from at least one portable unit to at least one base unit;
    at least one secondary unit constructed and arranged to repeat said message only upon the condition that no primary unit has repeated said message, and not another secondary unit has repeated said message.

2. A dual level prioritized vehicular repeater system, comprising:
    at least one primary unit constructed and arranged such that only one primary unit has, at any particular time, priority to repeat a message from at least one portable unit to at least one base unit;
    at least one secondary unit, constructed and arranged to repeat said message only upon the condition that no primary unit has repeated said message, and no other secondary unit repeats said message before the expiration of a predetermined time interval.

3. A method for controlling the priority operation of a vehicular repeater system, having at least one primary unit and at least one primary unit and at least one secondary unit, comprising the steps of:
    at said at least one primary unit:
        (a) receiving a message to be repeated;
        (b) repeating said message only upon the condition that no other primary unit repeats said message;
    at least one said secondary unit:
        (a) receiving said message to be repeated;
        (b) repeating said message only upon the condition that no primary unit or another secondary unit repeats said message.

4. A method for controlling the priority operation of a vehicular repeater system, having at least one primary unit and at least one secondary unit, comprising the unit steps of:
    at said at least one primary unit:

(a) receiving a message to be repeated;
(b) repeating said message only upon the condition that no other primary unit repeats said message before the expiration of a first time interval;

at said at least one secondary unit:
(a) receiving said message to be repeated;
(b) repeating said message only upon the condition that no primary unit or another secondary unit repeats said message before the expiration of a second time interval, which is longer in duration than said first time interval.

5. A method for controlling the priority operation of a vehicular repeater system, having at least one primary unit and at least one secondary unit, comprising the secondary unit steps of:
(a) receiving a message to be repeated;
(b) repeating said message only upon the condition that no primary unit has repeated said message, and no other secondary unit has repeated said message, wherein step (b) further comprises the steps of:
(b1) determining if any of said at least one primary unit has transmitted;
(b2) determining if another said at least one secondary units has transmitted;
(b3) repeating said message only if steps (b1) and (2) determine that no primary unit or any other secondary unit has repeated said message.

6. A method for controlling the priority operation of a vehicular repeater system, having at least one primary unit and at least one secondary unit, comprising the secondary unit repeats said message before the expiration of a predetermined time interval,
wherein step (b) further comprises the steps of:
(b1) determining if any of said at least one primary unit has transmitted;
(b2) determining if another of said at least one secondary units has transmitted;
(b3) repeating said message only if steps (b1) and (b2) determine that no primary unit or any other secondary unit has repeated said message within a predetermined time interval.

* * * * *

UNITED STATES PATENT AND TRADEMARK OFFICE
CERTIFICATE OF CORRECTION

PATENT NO. : 5,056,152
DATED : OCTOBER 8, 1991
INVENTOR(S) : TRUBY ET AL

It is certified that error appears in the above-identified patent and that said Letters Patent is hereby corrected as shown below:

Column 6, line 5, delete "(2)" and insert therefor -- (b2) --.

Signed and Sealed this

Seventh Day of September, 1993

*Attest:*

BRUCE LEHMAN

*Attesting Officer*   *Commissioner of Patents and Trademarks*